US009141517B2

(12) United States Patent
Hrastnik

(10) Patent No.: US 9,141,517 B2
(45) Date of Patent: Sep. 22, 2015

(54) PUBLIC SOLUTION MODEL TEST AUTOMATION FRAMEWORK

(75) Inventor: Jan Hrastnik, Sandhausen (DE)

(73) Assignee: SAP SE, Walldorf (DE)

(*) Notice: Subject to any disclaimer, the term of this patent is extended or adjusted under 35 U.S.C. 154(b) by 240 days.

(21) Appl. No.: 13/525,216

(22) Filed: Jun. 15, 2012

(65) Prior Publication Data

US 2013/0339792 A1    Dec. 19, 2013

(51) Int. Cl.
*G06F 11/00*    (2006.01)
*G06F 11/36*    (2006.01)
*G06F 11/34*    (2006.01)

(52) U.S. Cl.
CPC ........ *G06F 11/3672* (2013.01); *G06F 11/3447* (2013.01); *G06F 11/3684* (2013.01)

(58) Field of Classification Search
CPC . G06F 11/36; G06F 11/3664; G06F 11/3668; G06F 11/3684; G06F 11/3682; G06F 11/3696; G06F 11/3447
USPC ..................................... 714/26, 27, 33, 38.14
See application file for complete search history.

(56) References Cited

U.S. PATENT DOCUMENTS

| 6,496,833 | B1 * | 12/2002 | Goldberg et al. ....................... 1/1 |
| 6,523,027 | B1 * | 2/2003 | Underwood ........................... 1/1 |
| 8,904,541 | B2 * | 12/2014 | Soby et al. ....................... 726/25 |
| 9,015,677 | B2 * | 4/2015 | Tunik et al. .................... 717/135 |
| 2004/0128651 | A1 * | 7/2004 | Lau ................................. 717/124 |
| 2005/0125401 | A1 * | 6/2005 | Carr et al. ........................... 707/5 |
| 2007/0043956 | A1 * | 2/2007 | El Far et al. .................. 713/189 |
| 2007/0092069 | A1 * | 4/2007 | Royzen et al. ............. 379/27.04 |
| 2007/0168971 | A1 * | 7/2007 | Royzen et al. ................. 717/124 |
| 2007/0169016 | A1 * | 7/2007 | Aakolk et al. ................. 717/136 |
| 2008/0086348 | A1 * | 4/2008 | Rao et al. ............................ 705/7 |
| 2008/0086499 | A1 * | 4/2008 | Wefers et al. ................. 707/102 |
| 2008/0126390 | A1 * | 5/2008 | Day et al. ....................... 707/102 |
| 2008/0209567 | A1 * | 8/2008 | Lockhart et al. ................. 726/25 |
| 2008/0244323 | A1 * | 10/2008 | Kelso ............................... 714/38 |
| 2010/0318974 | A1 * | 12/2010 | Hrastnik et al. .............. 717/135 |
| 2011/0173591 | A1 * | 7/2011 | Prasad .......................... 717/126 |
| 2011/0320879 | A1 * | 12/2011 | Singh et al. ................... 714/38.1 |
| 2012/0023484 | A1 * | 1/2012 | Demant et al. ................ 717/125 |
| 2012/0030515 | A1 * | 2/2012 | Birakoglu et al. ........... 714/38.1 |
| 2012/0042210 | A1 * | 2/2012 | Glaser et al. ................. 714/38.1 |
| 2012/0221893 | A1 * | 8/2012 | Bai et al. .......................... 714/27 |
| 2013/0055028 | A1 * | 2/2013 | Patil et al. .................... 714/38.1 |
| 2014/0344786 | A1 * | 11/2014 | Adamson ...................... 717/124 |

* cited by examiner

*Primary Examiner* — Marc Duncan
(74) *Attorney, Agent, or Firm* — Mintz Levin Cohn Ferris Glovsky and Popeo, P.C.

(57) ABSTRACT

Methods and apparatus, including computer program products, are provided for testing data structures, such as for example business objects. In some implementations, there is provided a method. The method may include generating, at a test system, a test script including a test business object generated based on metadata describing aspects of a deployed business object at a target system; receiving, at the test system, a request to test the target system including the deployed business object; testing, based on the generated test script including the test business object, at least one of a data and an action of the deployed business object; and generating, at the test system, at least a result of the testing. Related systems, methods, and articles of manufacture are also disclosed.

12 Claims, 5 Drawing Sheets

PUBLIC SOLUTION MODEL TEST AUTOMATION FRAMEWORK

FIELD

The present disclosure generally relates to data processing and, in particular, testing.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture including on-premises components. As such, the organization can in some cases be more effectively served by an on-demand system or component, such as a software as a service (SaaS) arrangement in which the ERP system architecture is hosted on computing hardware such as servers and data repositories that are maintained remotely from the organization's location and accessed on-demand by authorized users at the organization via a thin client, such as for example a web browser, over a network.

SUMMARY

Methods and apparatus, including computer program products, are provided for testing data structures, such as for example business objects. In some implementations, there is provided a method. The method may include generating, at a test system, a test script including a test business object generated based on metadata describing aspects of a deployed business object at a target system; receiving, at the test system, a request to test the target system including the deployed business object; testing, based on the generated test script including the test business object, at least one of a data and an action of the deployed business object; and generating, at the test system, at least a result of the testing. Related systems, methods, and articles of manufacture are also disclosed.

In some implementations, the above-noted aspects may further include additional features described herein including one or more of the following. The generating may include generating the test business object based on metadata describing one or more components of the deployed business object at the target system. The generating may include generating the test business object based on metadata describing a structure of the deployed business object at the target system. The structure may include at least one of information representative of how to traverse the deployed business object, an action at the deployed business object, a method at the deployed business object, a data format at the deployed business object, a data type at the deployed business object, and a runtime behavior of the deployed business object. The testing may further include testing a query at deployed business object. The testing may further include testing a data retrieval at the deployed business object.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
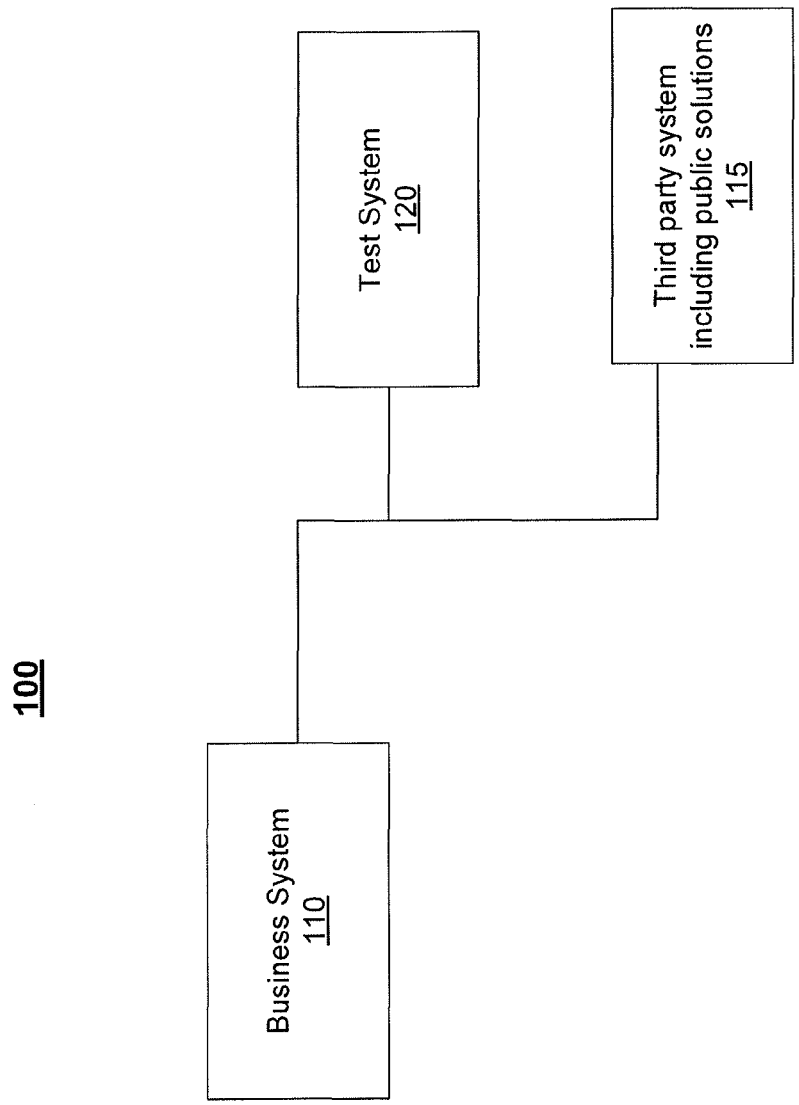
FIG. 1 depicts an example of a system including a test framework, in accordance with some exemplary implementations.

Like labels are used to refer to same or similar items in the drawings.

DETAILED DESCRIPTION

When a business system is deployed, the business system may include one or more components provided by an application developer and other parties including the end-user and other development entities (often referred to as partner or third party developers). In any case, these components of the system may be published as content exposed as a so-called "public solution" to allow use by the other parties and the like. However, changes to the exposed component serving as a public solution may result in unintended consequences. For example, one or more third party developer may make a change, such as delete a portion of a data structure, such as a business object node and/or its attributes. Although this simple change may be detected using a generic check, more complex changes including changes visible only during runtime may require enhanced testing, as disclosed herein, to determine the suitability of the change. To that end, the subject matter disclosed herein relates to a test system.

In some implementations, a test system may be configured to automate checks and generate test scripts. For example, the checks may be wrapped by business objects configured for testing of the component made available as a public solution. Moreover, these test business objects may be defined and executed to allow testing of the component made available as a public solution and implemented at a third party location. The structure of the test business objects may follow a predefined pattern. Furthermore, the test system may programmatically generate the test business objects based on metadata associated with component made available as a public solution). For example, metadata, which describes the business objects of the public solution, may allow designtime and/or runtime testing of the business object. Specifically, the metadata may describe the structure of the business object (e.g., how to traverse the nodes and associations of the business objects), the actions/methods of the business object, the data formats/types of the business objects, and the runtime behavior of the business object. As such, the generation of one or more test business objects may be based on metadata to test specific functional designtime and/or runtime aspects of the component made available as a public solution, which includes business objects.

FIG. 1 depicts a system 100 including a development system 110, a third party system 115 which includes public solutions made available by development system 110, and a test system 120. In some exemplary implementations, test system 120 may include at least one test script including a test business object to test aspects of third party system 115 including business objects therein.

Figure 2A:
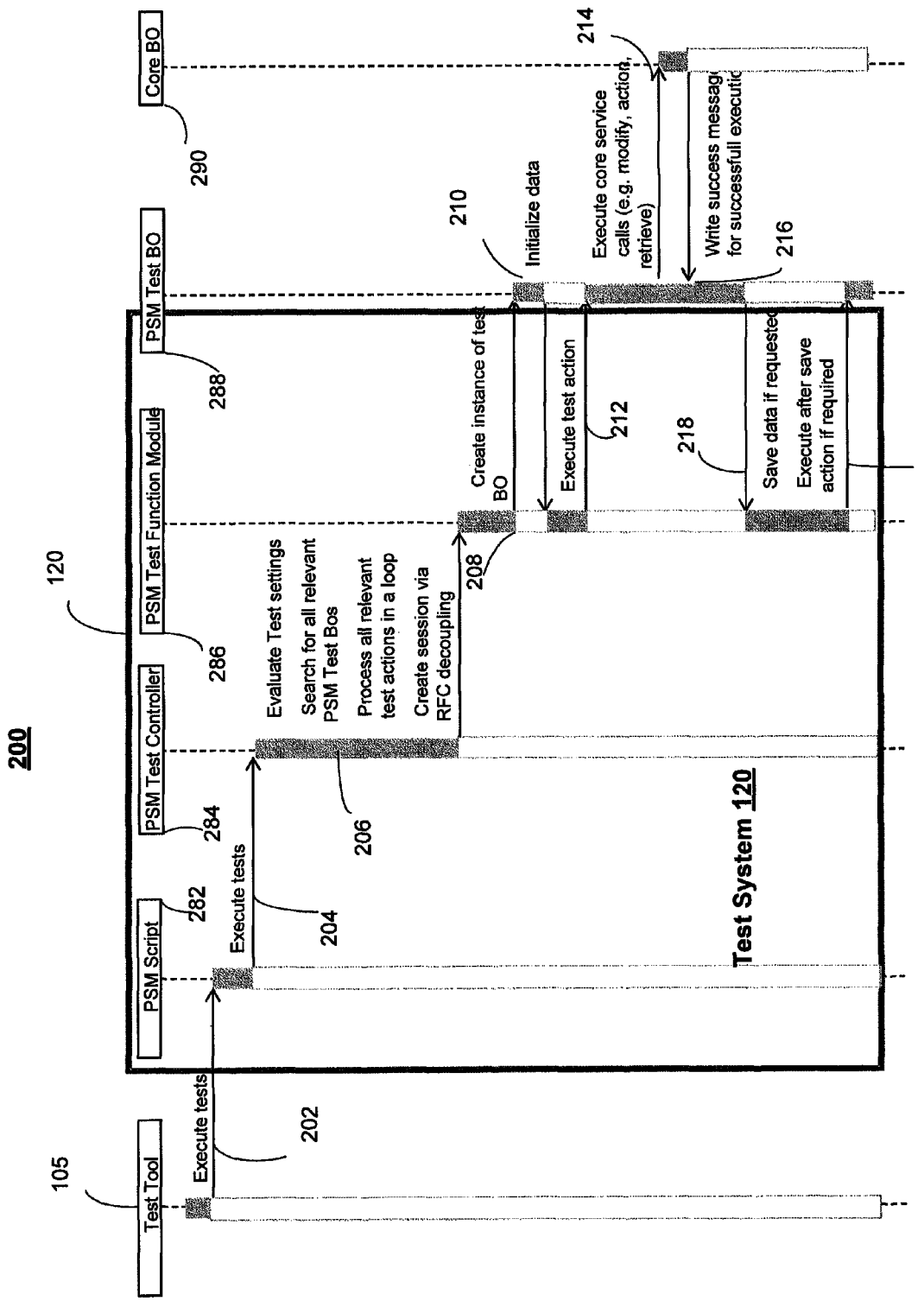
FIGS. 2A-2B depict an example process for testing, in accordance with some exemplary implementations.
Figure 2B:
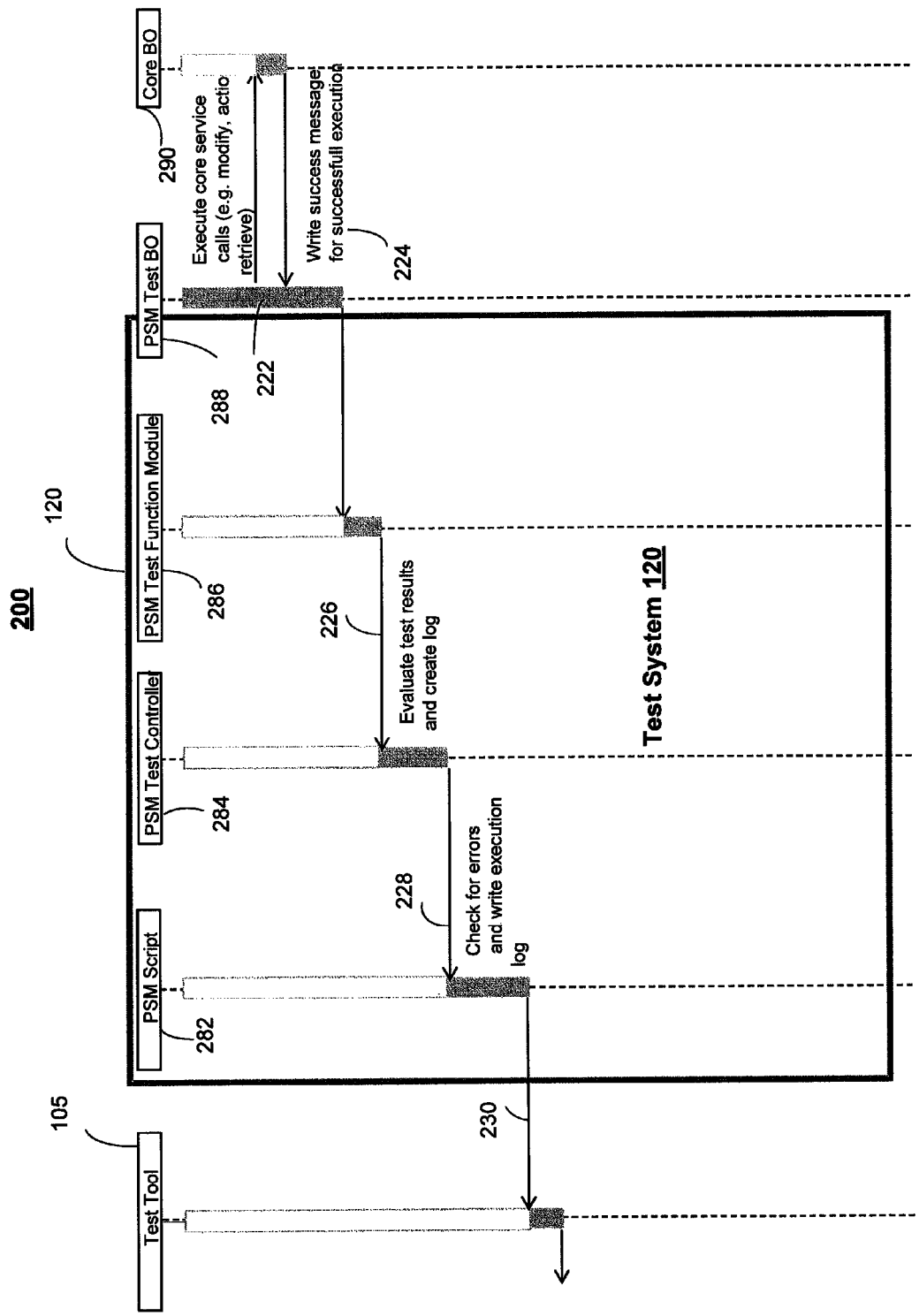

FIGS. 2A-2B depict a process 200 for testing, in accordance with some exemplary embodiments. The description of FIG. 2A also refers to FIG. 1.

At 202, test system 120 may receive a request from another application or tool 105, such as a user interface, to execute a test of one or more aspects of third party system 115, which includes at least one public solution made available by development system 110. For example, the request may initiate testing of one or more components of third party system 115. And, these components may include a business object comprising at least one of data and a method.

At 204, test system 120 may execute a test based on a test script 282. For example, the request may initiate a test of a specific business object at the third party system 115 (also referred to as a third party business system). As noted, the third party system 115 may include a component, which was published and thus made available as a public solution at development system 110. Once downloaded to third party system 115, the component may include at least one business object (or data structure) modified by, for example, a third party to introduce new fields that need to be populated by a caller of the system, to change from automated creation of a sub-business object instance to explicit requests, to introduce additional consistency checks that require additional data, and so forth.

The test script 282 may be generated by the test system 120 based on metadata describing aspects of the third party system 115 and/or business objects at the third party system 115. And, these business objects may have been made available as a public solution by development system 110. The test script 282 may be generated to test the designtime and/or runtime behavior of the specific business object at the third party business system 115. For example, the test script 282 may traverse a business object at third party system 115 to detect changes in the actions/methods or data of the business object and, in particular, detect changes that may cause errors in the third party system 115. These errors may typically require corrections such as adjustments to implementation and/or modeling at third party system 115.

The test script 282 may also test content associated with a component (or business object) at third party system 115 to ensure consistency. For example, mandatory fields in a business object, which are public and made available, should be consistent (e.g., the business objects at system 110 and system 115 should be consistent). The test script 282 may include negative tests for verifying that partners have not caused any data inconsistencies that cannot be resolved or caused any contradictions in global restrictions (e.g., cardinality mismatches, etc.) The test script 282 may include regression tests for detecting incompatible changes that may be introduced by the third party at third party system 115. The test script 282 may also test for any changes in the runtime behavior of the business objects at third party system 115.

In some implementations, the test script 282 may be configured to test specific aspects of the component at third party system 115. For example, the test script 282 may test the creation of a consistent business object in third party system 115. Moreover, the test script 282 may also test the creation of a business object of the component under test at the third party system 115 or test a query of the component under test at third party system 115. The test script 282 may also test the retrieval of data from a specific portion of the data structure or business object (e.g., retrieval of data from a sub-node of the business object) at third party system 115. The test script 282 may also check to see if portions of the business object at third party system 115 have been changed since originally deployed, and may test specific action calls of the business object at third party system 115.

In some implementations, the test script 282 may be implemented as a test business object, which includes data and methods. Moreover, the test business object may be associated with a specific, released business object at third party system 115. These specific, business objects at third party system 115 may also be referred to as core business objects.

The test system 120 may be implemented as a central test framework for automated execution of test scripts 282. To enable a test business object for executing test actions, one or more of the following may be configured at the test business object: an action may be defined on a root node of a test business object and may be labeled with a predetermined suffix, such as "_ForTesting"; execution of an action may occur at least once in a session after a test business object instance is created; a creation call on the test business object root level (without passing attribute values) may be executed before calling a test action; defaulting may be implemented as an AFTER_MODIFY determination of the test business object root node; other actions may be defined for encapsulating reusable functionality within the test business object; a test business object may be configured to raise meaningful error messages in case that problems are detected; a test execution may be signaled by a success message of the test business object.

At 206, a test controller 284 receives test script 282 and executes the test script 282. For example, test controller 284 may evaluate any test settings for the test script 282, search for test business objects which may be used during testing, and then process the test script 282 including any relevant actions in the test script 282. Next, test controller 284 may create a session for execution of the test script 282.

At 208, a test function module 286 may create a test business object. To instantiate the test business object, data may be retrieved at 210. The test business object may be used to test the static and/or runtime behavior of a business object at third party system 115 (e.g., a core business object implemented as a public solution made available by system 110).

At 212, the test function module 286 may execute one or more aspects of the test script 282 based on the test business object. For example, the test business object may be used to act on business objects (labeled core business objects at FIG. 2A) at third party system 115. Furthermore, the test business object may invoke an aspect of the third party system 115, such as execute a service at the third party system 115. For example, the invocation may result in an action, such as modify a business object at the third party system and/or retrieve data from a business object at the third party system 115, and the like), as shown at 214.

At 216, any results of the execution may be written to the test business object 288, where the test data 218 is saved and any additional executions are performed after the save at 220. These additional executions may be performed at 222 and written at 224. In any case, the test function module 286 may send at 226 the test results and test log to the test controller 284, which forwards the results and/or test log to the test script generator 282. The test script generator 282 may then check the results and/or logs for errors, and then forward the results to the test tool 202.

The example of system 100 may be implemented in a variety of business systems including stand-alone, distributed, and/or cloud-based solutions. However, the following description relates to an implementation of system 100 in a cloud-based framework, such as a software-as-a-service (SaaS) arrangement in which the business software system architecture is hosted on computing hardware, such as servers and data repositories maintained remotely from the organization's location and accessed by authorized users at the organization via a thin client, such as for example a web browser, over a network.

Cloud computing makes practical the development and deployment of a business system that includes flexibility in the specific components deployed in the business system. For example, a business system, such as an enterprise resource planning system, may be developed by a developer with a core functionality and then made public to other developers, such as third party developers, end-user developers, and consultants. Although this model enables business systems to grow in capability due to the contributions of third parties, testing becomes a challenge. For example, the developer may need to test the core business system and its operability with changes implemented by one or more third parties at third party systems. To that end, the subject matter disclosed herein provides a test system (also referred to as a test framework) to allow automated testing.

To make more efficient use of computing resources of a software-as-a-service (SaaS) provider and to provide important performance redundancies and/or reliability, it may, in some implementations, be advantageous to host multiple tenants (e.g., parties, users, different entities, such as companies/organizations) on a single system that includes multiple servers and that maintains data for all of the multiple tenants in a secure manner while also providing customized solutions that are tailored to each tenant's business processes.

Figure 3:
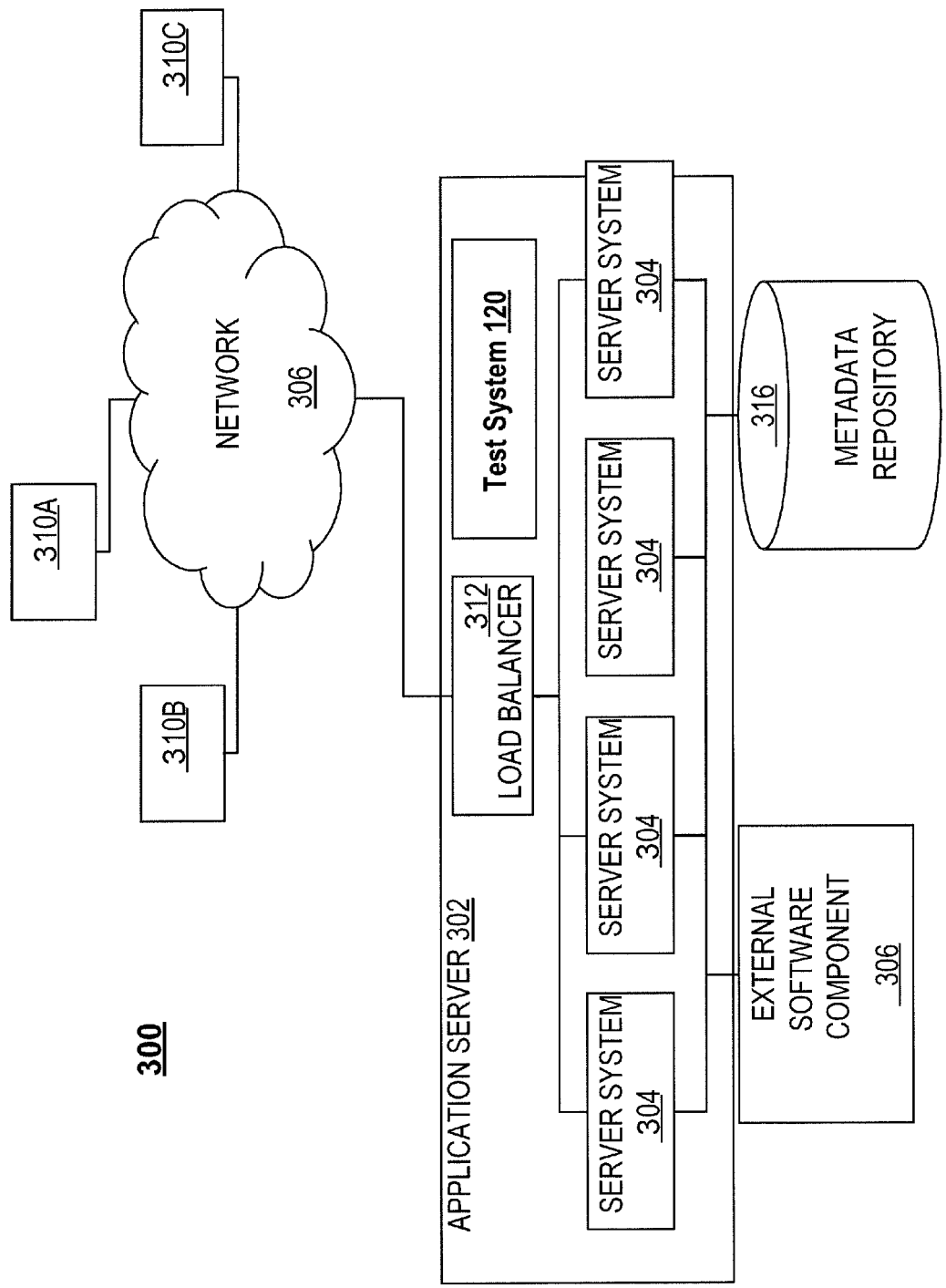
FIG. 3 depicts another example of a system including a test framework, in accordance with some exemplary implementations.

FIG. 3 shows a block diagram of a multi-tenant implementation of a software delivery architecture 300 that includes a test system 120 and an application server 302, which can in some implementations include multiple server systems 304 that are accessible over a network 306 from client machines operated by users at each of multiple organizations 310A-310C (referred to herein as "tenants" of a multi-tenant system) supported by a single software delivery architecture 300. For a system in which the application server 302 includes multiple server systems 304, the application server can include a load balancer 312 to distribute requests and actions from users at the one or more organizations 310A-310C to the one or more server systems 304. A user can access the delivery architecture across the network using a thin client, such as for example a web browser or the like, or other portal software running on a client machine. The application server 302 can access data and data objects stored in one or more data repositories 316. The application server 302 can also serve as a middleware component via which access is provided to one or more external software components 306 (e.g., public solutions tested by test system 120) that can be provided by third party developers.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 302 that includes multiple server systems 304 that handle processing loads distributed by a load balancer 312. Potential benefits from such an arrangement can, in some implementations, include, high and reliably continuous application server availability and minimization of unplanned downtime, phased updating of the multiple server systems 304 to permit continuous availability (one server system 304 can be taken offline while the other systems continue to provide services via the load balancer 312), scalability via addition or removal of a server system 304 that is accessed via the load balancer 312, and de-coupled lifecycle processes (such as for example system maintenance, software upgrades, etc.) that enable updating of the core software independently of tenant-specific customizations implemented by individual tenants.

As in the example illustrated in FIG. 3, the metadata repository 316 can store a business object that represents a template definition of a standard business process. Each individual tenant 310A-310C can customize that standard template according to the individual business process features specific to business of the organization to which that tenant is assigned. Customizations can be stored as extensions in the metadata repository.

Figure 4:
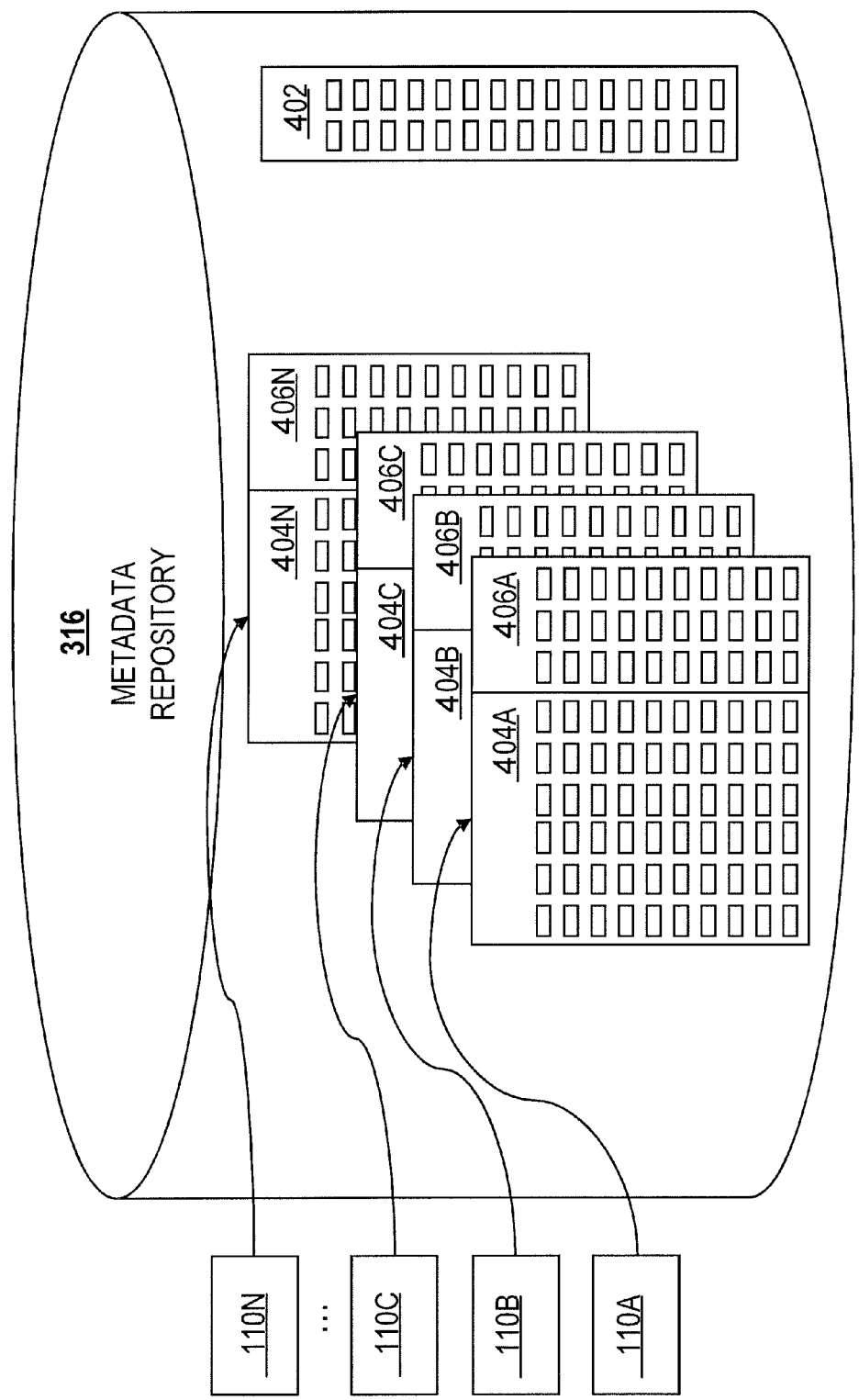
FIG. 4 depicts a data repository implemented to include core software platform content, system content, and tenant content, in accordance with some exemplary implementations.

To provide for customization of the business process for each of multiple organizations supported by a single software delivery architecture 300, the data and data objects stored in the metadata repository 316 and/or other data repositories that are accessed by the application server 302 can include three types of content as shown in FIG. 4: core software platform content 402 (e.g. a standard definition of a business process), system content 404, and tenant content 406. Core software platform content 402 includes content that represents core functionality and is not modifiable by a tenant. System content 404 can in some examples be created by the runtime of the core software platform and can include core data objects that store concrete data associated with specific instances of a given business process and that are modifiable with data provided by each tenant. The data retained in these data objects are tenant-specific: for example, each tenant 310A-310N can store information about its own inventory, sales order, etc.

Tenant content 406A-406N includes data objects or extensions to other data objects that are customized for one specific tenant 310A-310N to reflect business processes and data (e.g., business objects) that are specific to that specific tenant and are accessible only to authorized users at the corresponding tenant. Such data objects can include a key field (for example "client" in the case of inventory tracking) as well as one or more of master data, business configuration information, transaction data, or the like. For example, tenant content 406 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like).

Furthermore, the tenant content 406A-N may be considered a public solution and include business objects as described above with respect to FIGS. 1 and 2A-B. As such, the test system 120 may be used to test the content modifiable by a tenant, such as system content and tenant content including the business objects therein, in accordance with the processes disclosed herein, such as process 200.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A computer-readable medium containing instructions to configure at least one processor to perform operations comprising:

generating, at a test system, a test script including a test business object generated based on metadata describing aspects of a structure of a deployed business object at a target system, wherein the structure comprises information representative of how to traverse the deployed business object, at least one of an action or a method at the deployed business object, a data format at the deployed business object, a data type at the deployed business object, and a runtime behavior of the deployed business object, wherein the target system comprises a third party system;

receiving, at the test system, a request to test the target system including the deployed business object;

testing, based on the generated test script including the test business object, at least one of a data and an action of the deployed business object; and generating, at the test system, at least a result of the testing.

2. The computer-readable medium of claim 1, wherein the generating further comprises generating the test business object based on metadata describing one or more components of the deployed business object at the target system.

3. The computer-readable medium of claim 1, wherein the testing further comprises testing a query at deployed business object.

4. The computer-readable medium of claim 1, wherein the testing further comprises testing a data retrieval at the deployed business object.

5. A system comprising:

at least one processor; and at least one memory including code which when executed by the at least one processor provides operations comprising:

generating, at a test system, a test script including a test business object generated based on metadata describing aspects of a structure of a deployed business object at a target system, wherein the structure comprises information representative of how to traverse the deployed business object, at least one of an action or a method at the deployed business object, a data format at the deployed business object, a data type at the deployed business object, and a runtime behavior of the deployed business object, wherein the target system comprises a third party system;

receiving, at the test system, a request to test the target system including the deployed business object;

testing, based on the generated test script including the test business object, at least one of a data and an action of the deployed business object; and generating, at the test system, at least a result of the testing.

6. The system of claim 5, wherein the generating further comprises generating the test business object based on metadata describing one or more components of the deployed business object at the target system.

7. The system of claim 5, wherein the testing further comprises testing a query at deployed business object.

8. The system of claim 5, wherein the testing further comprises testing a data retrieval at the deployed business object.

9. A method comprising:

generating, at a test system, a test script including a test business object generated based on metadata describing aspects of a structure of a deployed business object at a target system, wherein the structure comprises information representative of how to traverse the deployed business object, at least one of an action or a method at the deployed business object, a data format at the deployed business object, a data type at the deployed business object, and a runtime behavior of the deployed business object, wherein the target system comprises a third party system;

receiving, at the test system, a request to test the target system including the deployed business object;

testing, based on the generated test script including the test business object, at least one of a data and an action of the deployed business object; and generating, at the test system, at least a result of the testing.

10. The method of claim 9, wherein the generating further comprises generating the test business object based on metadata describing one or more components of the deployed business object at the target system.

11. The method of claim 9, wherein the testing further comprises testing a query at deployed business object.

12. The method of claim 9, wherein the testing further comprises testing a data retrieval at the deployed business object.

* * * * *